(12) United States Patent
Ray et al.

(10) Patent No.: US 11,277,641 B2
(45) Date of Patent: Mar. 15, 2022

(54) CHROMA TRANSFORM SKIP AND JOINT CHROMA CODING ENABLED BLOCK IN VIDEO CODING

(71) Applicant: QUALCOMM Incorporated, San Diego, CA (US)

(72) Inventors: Bappaditya Ray, San Diego, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/136,856

(22) Filed: Dec. 29, 2020

(65) Prior Publication Data
US 2021/0203993 A1 Jul. 1, 2021

Related U.S. Application Data

(60) Provisional application No. 62/955,830, filed on Dec. 31, 2019.

(51) Int. Cl.
*H04N 19/00* (2014.01)
*H04N 19/625* (2014.01)
(Continued)

(52) U.S. Cl.
CPC ........... *H04N 19/625* (2014.11); *H04N 19/12* (2014.11); *H04N 19/132* (2014.11);
(Continued)

(58) Field of Classification Search
CPC .... H04N 19/625; H04N 19/12; H04N 19/132; H04N 19/147; H04N 19/176; H04N 19/186
See application file for complete search history.

(56) References Cited

U.S. PATENT DOCUMENTS

| 2021/0058643 A1* | 2/2021 | Zhao .................... H04N 19/107 |
| 2021/0120272 A1* | 4/2021 | Auyeung ............... H04N 19/70 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.

(Continued)

*Primary Examiner* — Zhihan Zhou
(74) *Attorney, Agent, or Firm* — Shumaker & Sieffert, P.A.

(57) ABSTRACT

A method of encoding video data includes determining a first rate-distortion value associated with encoding a first chroma block of a coding unit of the video data with a first transform type, determining a second rate-distortion value associated with encoding the first chroma block of the coding unit of the video data with a second transform type, determining that the first transform type provides better rate-distortion than second transform type based on the first rate-distortion value and the second rate-distortion value, based on the determination that the first transform type provides better rate-distortion, determining a third rate-distortion value associated with encoding the coding unit with joint coding of chroma residuals (JCCR) with the first transform type, and avoiding determining a fourth rate-distortion value associated with encoding the coding unit with JCCR with the second transform type, and encoding the coding unit with JCCR with the first transform type.

29 Claims, 6 Drawing Sheets

(51) Int. Cl.
    *H04N 19/186*     (2014.01)
    *H04N 19/132*     (2014.01)
    *H04N 19/176*     (2014.01)
    *H04N 19/12*     (2014.01)
    *H04N 19/147*     (2014.01)

(52) U.S. Cl.
    CPC ......... *H04N 19/147* (2014.11); *H04N 19/176* (2014.11); *H04N 19/186* (2014.11)

(56) References Cited

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

Bross B., et al., "Versatile Video Coding (Draft 6)", 127th MPEG and 15th JVET Meeting, Jul. 3-12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages.

Bross B., et al., "Versatile Video Coding (Draft 7)", 16. JVET Meeting, Oct. 1-11, 2019, Geneva, (The Joint Video Exploration Team of ISO/IEC JTC1/SC29/WG11 and ITU-T SG. 16), No. JVET-P2001, Nov. 14, 2019 (Nov. 14, 2019), XP030224330, 494 Pages Retrieved from the Internet: URL: http://phenix.int-evry.fr/jvet/doc_end_user/documents/16_Geneva/wg11/JVET-P2001-v14.zip JVET-P2001-vE.docx.

Clare G., et al., "CE8-4.1: BDPCM and Transform skip for Chroma", JVET-P0059-v1, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-6.

Helmrich C., et al., "CE7: Joint chroma Residual Coding with Multiple Modes (tests CE7-2.1, CE7-2.2)", Joint Video Experts Team (JVET) of ITU-T SG 16 WP 3 and ISO/IEC JTC 1/SC 29/WG 11, JVET-O0105-V2, 15th Meeting, Gothenburg, SE, Jul. 3-12, 2019, 9 pages, XP030205735, Retrieved from the Internet: URL: http://phenix.int-evry.fr/ivet/doc_end_user/documents/15_Gothenburg/wg11/JVET-O0105-v2.zip. JVET-O0105-v2.docx retrieved on Jun. 21, 2019].

International Search Report and Written Opinion—PCT/US2020/067453—ISA/EPO—dated Feb. 24, 2021, 14 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ray B., et al., "On the Combination of JCCR and TS", JVET-Q0408-v2, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-8.

Tsukuba (Sony) T., et al., "On Transform Skip in JointCbCr Mode", 17. JVET Meeting, Jan. 7-17, 2020; Brussels, (The Joint Video Exploration Team of ISO/IEC JTC1/SC29/WG11 and ITU-T SG.16), No. JVET-Q0101-v1, m51690, Dec. 29, 2019 (Dec. 29, 2019), XP030222576, pp. 1-6, Retrieved from the Internet: URL:http://phenix.int-evry.fr/jvet/doc_end_user/documents/17_Brussels/wg11/JVET-Q0101-v2.zip JVET-Q0101-v1.docx [retrieved on Dec. 29, 2019], pp. 1, 2 abstract.

Tsukuba T., et al., "CE8-2.1: Transform Skip for Chroma with Limiting Maximum Number of Context-Coded Bin in TS Residual Coding", JVET-P0058-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-10.

Xiu (Kwai) X., et al., "Combined Encoder Improvements of JVET-Q0101/JVET-Q0408/JVET-Q0514 on JCCR with Chroma Transform Skip", 17. JVET Meeting, Jan. 7-17, 2020, Brussels, (The Joint Video Exploration Team of ISO/IEC JTC1/SC29/WG11 and ITU-TSG.16), No. JVET-Q0695, m52658, Jan. 16, 2020 (Jan. 16, 2020), XP030224073, pp. 1-8.

Xiu X., et al., "AHG11: Encoder Improvements on JCCR with Chroma Transform Skip Mode", JVET-Q0514_r1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Xu L., et al., "CE8-related: A SPS Level Flag for BDPCM and JCCR", JVET-00376-v3, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-4.

Xu X., et al., "Description of Core Experiment 2 (CE2): Palette Mode Coding", JVET-P2022-v3, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.

* cited by examiner

CHROMA TRANSFORM SKIP AND JOINT CHROMA CODING ENABLED BLOCK IN VIDEO CODING

This application claims the benefit of U.S. Provisional Patent Application 62/955,830, filed Dec. 31, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for a single rate distortion search for selecting a transform between a first transform type and a second transform type when joint coding of chroma residuals (JCCR) is enabled in video coding. This disclosure also describes examples where JCCR may not be used based on determined transform types for residual values of chroma components. In some examples, the first transform type is a discrete cosine transform (DCT), such as DCT-2, and the second transform type is transform skip (e.g., not performing a transform). By performing a single rate distortion search for selecting a transform between the first transform type and the second transform type, computational efficiencies may be realized because multiple rate distortion searches may not be needed.

In one example, the disclosure describes a method of encoding video data, the method comprising determining a first rate-distortion value associated with encoding a first chroma block of a coding unit of the video data with a first transform type, determining a second rate-distortion value associated with encoding the first chroma block of the coding unit of the video data with a second transform type, determining that the first transform type provides better rate-distortion than second transform type based on the first rate-distortion value and the second rate-distortion value, based on the determination that the first transform type provides better rate-distortion, determining a third rate-distortion value associated with encoding the coding unit with joint coding of chroma residuals (JCCR) with the first transform type, and avoiding determining a fourth rate-distortion value associated with encoding the coding unit with JCCR with the second transform type, and encoding the coding unit with JCCR with the first transform type, wherein encoding the coding unit with JCCR with the first transform type comprises generating a first residual block for the first chroma block of the coding unit and a second residual block for a second chroma block of the coding unit, generating a joint residual block based on the first residual block and the second residual block, and signaling information based on the joint residual block.

In one example, the disclosure describes a device for encoding video data, the device comprising memory configured to store the video data and processing circuitry configured to determine a first rate-distortion value associated with encoding a first chroma block of a coding unit of the video data with a first transform type, determine a second rate-distortion value associated with encoding the first chroma block of the coding unit of the video data with a second transform type, determine that the first transform type provides better rate-distortion than second transform type based on the first rate-distortion value and the second rate-distortion value, based on the determination that the first transform type provides better rate-distortion, determine a third rate-distortion value associated with encoding the coding unit with joint coding of chroma residuals (JCCR) with the first transform type, and avoid determining a fourth rate-distortion value associated with encoding the coding unit with JCCR with the second transform type, and encode the coding unit with JCCR with the first transform type, wherein to encode the coding unit with JCCR with the first transform type, the processing circuitry is configured to generate a first residual block for the first chroma block of the coding unit and a second residual block for a second chroma block of the coding unit, generate a joint residual block based on the first residual block and the second residual block, and signal information based on the joint residual block.

In one example, the disclosure describes a computer-readable storage medium having instructions stored thereon that when executed cause one or more processors to determine a first rate-distortion value associated with encoding a first chroma block of a coding unit of the video data with a first transform type, determine a second rate-distortion value associated with encoding the first chroma block of the coding unit of the video data with a second transform type, determine that the first transform type provides better rate-distortion than second transform type based on the first rate-distortion value and the second rate-distortion value, based on the determination that the first transform type provides better rate-distortion, determine a third rate-distortion value associated with encoding the coding unit with joint coding of chroma residuals (JCCR) with the first transform type, and avoid determining a fourth rate-distortion value associated with encoding the coding unit with JCCR with the second transform type, and encode the coding unit with JCCR with the first transform type, wherein the instructions that cause the one or more processors to encode the coding unit with JCCR with the first transform type comprise instructions that cause the one or more processors to generate a first residual block for the first chroma block of the coding unit and a second residual block for a second chroma block of the coding unit, generate a joint residual block based on the first residual block and the second residual block, and signal information based on the joint residual block.

In one example, the disclosure describes a device for encoding video data, the device comprising means for determining a first rate-distortion value associated with encoding a first chroma block of a coding unit of the video data with a first transform type, means for determining a second rate-distortion value associated with encoding the first chroma block of the coding unit of the video data with a second transform type, means for determining that the first transform type provides better rate-distortion than second transform type based on the first rate-distortion value and the second rate-distortion value, based on the determination that the first transform type provides better rate-distortion, means for determining a third rate-distortion value associated with encoding the coding unit with joint coding of chroma residuals (JCCR) with the first transform type, and avoiding determining a fourth rate-distortion value associated with encoding the coding unit with JCCR with the second transform type, and means for encoding the coding unit with JCCR with the first transform type, wherein the means for encoding the coding unit with JCCR with the first transform type comprises means for generating a first residual block for the first chroma block of the coding unit and a second residual block for a second chroma block of the coding unit, means for generating a joint residual block based on the first residual block and the second residual block, and means for signaling information based on the joint residual block.

The details of one or more examples are set forth in the accompanying drawings and the description below. Other features, objects, and advantages will be apparent from the description, drawings, and claims.

DETAILED DESCRIPTION

Figure 1:
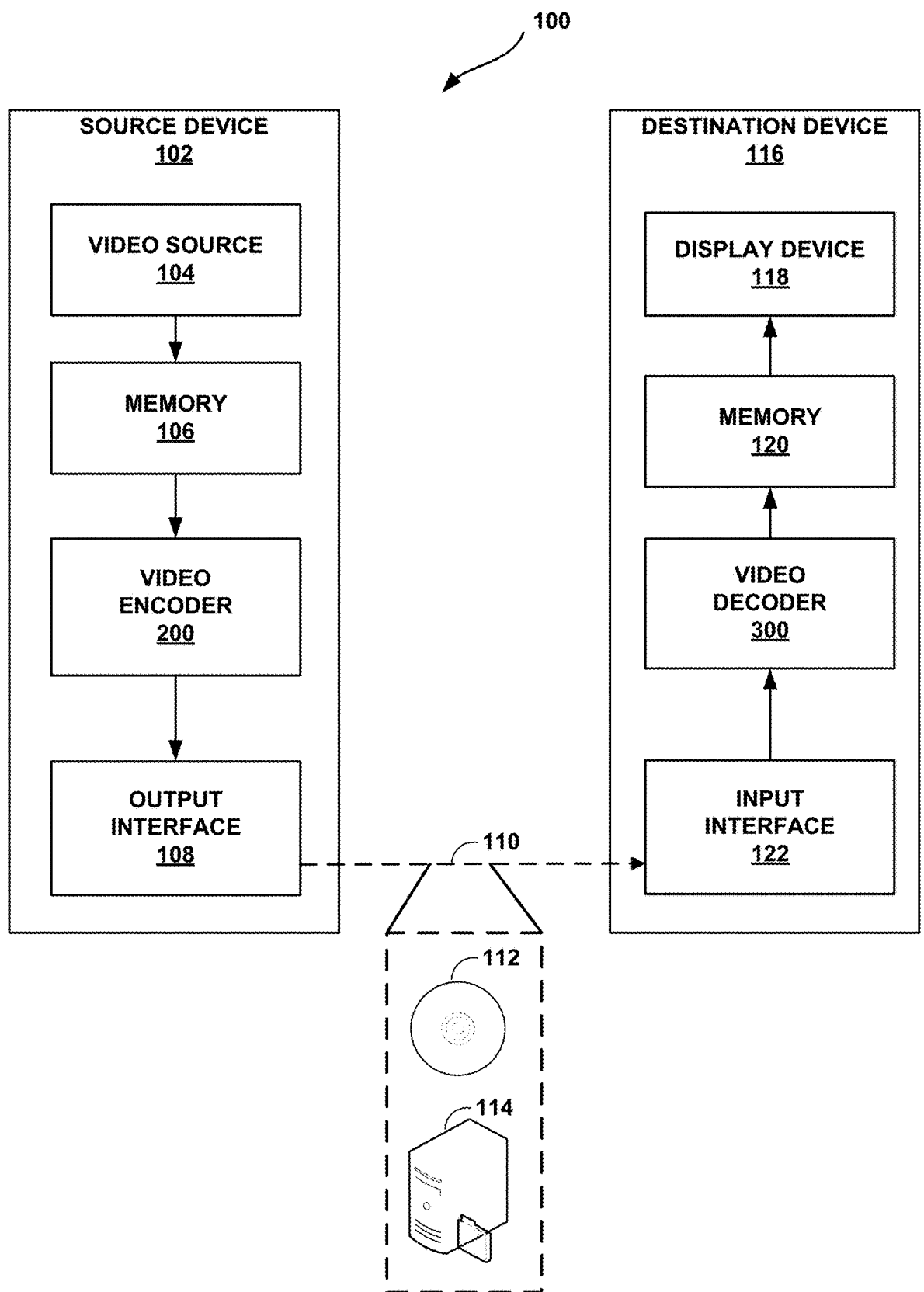
FIG. 1 is a block diagram illustrating an example video encoding and decoding system that may perform the techniques of this disclosure.

In video coding, a video encoder coordinates multiple encoding passes to test different coding modes with different sets of parameters for encoding block, and generates rate-distortion values for one or more of the coding modes and sets of parameters. Based on the rate-distortion values, the video encoder selects which coding mode and parameters to use for encoding the block. The rate-distortion value may be indicative of both the deviation of the video content of the block from the original block and the bit cost (e.g., number of bits needed to signal) for a particular coding mode and set of parameters. Lower rate-distortion values may tend to indicate lower distortion and/or low bit cost (e.g., better rate-distortion), as compared to higher rate-distortion values. That is, one coding mode may provide better rate-distortion if the rate-distortion value for the coding mode is less than the rate-distortion value for another coding mode.

However, checking all possible modes and parameters can increase encode complexity and delay encoding time. As an example, one coding mode is referred to as joint coding of chroma residuals (JCCR). In JCCR, the video encoder generates a first residual block for a first chroma block (e.g., Cb block) for a coding unit and a second residual block for a second chroma block (e.g., Cr block) for the coding unit. The first residual block represents a difference between a first prediction block and the first chroma block, and the second residual block represents a difference between a second prediction block and the second chroma block. In JCCR, the video encoder generates a joint residual block based on the first residual block and the second residual block. Consequently, in JCCR, only single residual block is signaled for both the chroma components.

Some example video coding systems use a transform skip coding mode and a transform enabled coding mode. In transform skip, a transform of the first and second residual blocks from a sample or pixel domain to a transform or frequency domain is skipped (i.e., not performed). In transform enabled, the first residual block is transformed from the sample or pixel domain to the transform or frequency domain to generate a first transformed residual block, and the second residual block is transformed from the sample or pixel domain to the transform or frequency domain to generate a second transformed residual block.

Accordingly, it may be possible to perform JCCR with transform skip mode and with transform enabled. In JCCR with transform skip, the video encoder may generate the joint residual block based on the first residual block and second residual block, and subsequently the joint residual block is transform skipped (e.g., the transform of the joint residual block is skipped). In JCCR with transform enabled, the video encoder may generate the joint residual block based on the first residual block and the second residual block, and subsequently the joint residual block is transformed.

In some examples, it may be possible for the video encoder to determine the rate-distortion values for JCCR with transform enabled and for JCCR with transform skip to determine whether to perform JCCR with transform enabled or with transform skip. In such examples, the video encoder may perform two encoding passes, one with JCCR with transform enabled and one with JCCR with transform skip, which increases encoding time.

This disclosure describes example techniques to reduce the number of encoding passes the video encoder may need to perform to determine whether to utilize JCCR with transform enabled or to utilize JCCR with transform skip. In some examples, the video encoder may already be configured to determine the rate-distortion values associated with encoding the first chroma block and the second chroma block with transform skip and transform enabled, without JCCR. That is, the video encoder may be configured to perform a first encoding pass to determine a first rate-distortion value for encoding the first chroma block with transform enabled and without JCCR, perform a second encoding pass to determine a second rate-distortion value for encoding the first chroma block with transform skip and without JCCR, perform a third encoding pass to determine a third rate-distortion value for encoding the second chroma block with transform enabled and without JCCR, and perform a fourth encoding pass to determine a fourth rate-distortion value for encoding the second chroma block with transform skip and without JCCR.

In accordance with one or more examples, the video encoder may utilize two or more of the first, second, third, and fourth rate-distortion values to determine whether to determine the rate-distortion value for JCCR with transform enabled or determine the rate-distortion value for JCCR with transform skip. If the first rate-distortion value indicates better rate-distortion than the second rate-distortion value and, optionally, the third rate-distortion value indicates better rate-distortion than the fourth rate-distortion value, then the video encoder may determine a rate-distortion value associated with encoding the coding unit with JCCR with transform enabled, and avoid determining a rate-distortion value associated with encoding the coding unit with JCCR with transform skip. Conversely, if the second rate-distortion value indicates better rate-distortion than the first rate-distortion value and, optionally, the fourth rate-distortion value indicates better rate-distortion than the third rate-distortion value, then the video encoder may determine a rate-distortion value associated with encoding the coding unit with JCCR with transform skip, and avoid determining a rate-distortion value associated with encoding the coding unit with JCCR with transform enabled.

In this way, rather than checking the rate-distortion values for both JCCR with transform enabled and JCCR with transform skip, the video encoder may check one of the rate-distortion value for JCCR with transform enabled or the rate-distortion value for JCCR with transform skip. In the above examples, transform enabled and transform skip is described, but the techniques are not so limited, and may be extend to a first transform type (e.g., one of the transforms, such as a DCT or a discrete sine transform (DST)) and a second transform type (e.g., another one of the transforms or no transform, such as transform skip).

Also, in some examples, there may be a first residual block and the other, second residual block may have all zero coefficients (e.g., after quantization with transform enabled or transform skip, the result is zero values for the residual block). In such examples, there may not be a need to determine rate-distortion values with encoding the second residual block with the first transform type or the second transform type because the second residual block has all zero coefficients.

Accordingly, in one or more examples, the video encoder may determine a first rate-distortion value associated with encoding a first chroma block (e.g., Cb or Cr block) of a coding unit of the video data with a first transform type (e.g., transform enabled with DCT or DST), determine a second rate-distortion value associated with encoding the first chroma block of the coding unit of the video data with a second transform type (e.g., another one of DCT or DST or transform skip), and determine that the first transform type provides better rate-distortion based on the first rate-distortion value and the second rate-distortion value (e.g., the first rate-distortion value is less than the second rate-distortion value). Based on the determination that the first transform type provides better rate-distortion, the video encoder may determine a third rate-distortion value associate with encoding the coding unit with joint coding of chroma residuals (JCCR) with the first transform type, and avoid determining a fourth rate-distortion value associated with encoding the coding unit with JCCR with the second transform type.

The video encoder may encode the coding unit with JCCR with the first transform type. For example, the video encoder may generate a first residual block for the first chroma block of the coding unit and a second residual block for a second chroma block of the coding unit, generate a joint residual block based on the first residual block and the second residual block, and signal information based of the joint residual block. For example, if the first transform type is DCT, then the video encoder may perform transform on the joint residual block to generate a transformed residual block, and signal information indicative of the transformed joint residual block. If, however, the first transform type is transform skip, then the video encoder may skip performing transform on the joint residual block, and signal information indicative of the joint residual block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 may be configured to apply the techniques for a limited (e.g., single) rate distortion search for selecting a transform between a first transform type and a second transform type when joint coding of chroma residuals (JCCR) is enabled in video coding. Video encoder 200 may be also be configured to determine that JCCR may not be used based on determined transform types for residual values of chroma components. Video decoder 300 may be configured to receive information indicating which transform type is selected and determine the residual values for the chroma components based on transform type. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions. During the April 2018 meeting of the Joint Video Experts Team (JVET), the Versatile Video Coding (VVC) standardization activity (also known as ITU-T H.266) was kicked off with the evaluation of the video compression technologies submitted to the Call for Proposals.

Video encoder 200 and video decoder 300 may operate according to Joint Exploration Test Model (JEM) or ITU-T H.266, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14, also called JVET-P2001-vE (hereinafter "VVC Draft 7"). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

The following describes Joint coding of chroma residuals (JCCR). In Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenberg, SE, 3-12 Jul. 2019, JVET-O2001-v14 (hereinafter "VVC Draft 6"), there is a mode where the chroma residuals are coded jointly. The usage (activation) of a joint chroma coding mode is indicated by a TU-level flag tu_joint_cbcr_residual_flag and the selected mode is implicitly indicated by the chroma CBFs. Here CBF indicates coded block flag indicating whether all the coefficients, after transform (if applicable) and quantization, are zeros for the corresponding residual block. CBF equal to 0 indicates that all the coefficients are zeros, thus the coefficients do not need to be coded. CBF equal to 1 indicates that not all the coefficients are zeros, thus the coefficients need to be coded.

The flag tu_joint_cbcr_residual_flag is present if either or both chroma CBFs for a TU are equal to 1. In the picture parameter set (PPS) and slice header, chroma QP (quantization parameter) offset values are signalled for the joint chroma residual coding mode to differentiate from the usual chroma QP offset values signaled for regular chroma residual coding mode. These chroma QP offset values are used to derive the chroma QP values for those blocks coded using the joint chroma residual coding mode. When a corresponding joint chroma coding mode (modes 2 in Table 1) is active in a TU, this chroma QP offset is added to the applied luma-derived chroma QP during quantization and decoding of the TU.

For the other modes (modes 1 and 3 in Table 1), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC'[x][y] in Table 1) is signalled, and residual block for Cb (resCb) and residual block for Cr (resCr) are derived based on information such as tu_cbf_cb, tu_cbf_cr, and CSign, which is a sign value specified in the picture header, as described in Versatile Test Model (VTM-7.0), https://vcgit.hhi.fraunhofer.de/jvetNVCSoftware_VTM/tree/VTM-7.0 and Helmrich, et al. "Joint chroma residual coding with multiple modes (tests CE7-2.1, CE7-2.2)," Joint Video Experts Team (JVET) of ITU-T SG 16 WP 3 and ISO/IEC JTC 1/SC 29/WG 11, 15th Meeting: 15th Meeting: Gothenberg, SE, 3-12 Jul. 2019, JVET-O0105 (hereinafter "JVET-O0105").

At the encoder side (e.g., by video encoder 200), the joint chroma components are derived as explained in the following. Depending on the mode, resJointC is generated by video encoder 200 as shown in Table 1. The reconstruction for the chroma residuals for different modes is shown in Table 2.

For all modes, the original residual at the encoder side is calculated as: resCb[x][y]=origCb[x][y]−predCb[x][y], and resCr[x][y]=origCr[x][y]−predCr[x][y]. The residuals derived at the decoder side res'Cb[x][y] and res'Cr[x][y], in general, are not the same as resCb[x][y] and resCr[x][y], due to transform and quantization, and due to joint representation.

TABLE 1

Generation of joint chroma residual

| tu_cbf_cb | tu_cbf_cr | Generation of joint residual | mode |
|---|---|---|---|
| 1 | 0 | resJointC[x][y] = (4 * resCb[x][y] + 2 * CSign * resCr[x][y])/5. | 1 |
| 1 | 1 | resJointC[x][y] = (resCb[x][y] + CSign * resCr[x][y])/2. | 2 |
| 0 | 1 | resJointC[x][y] = (4 * resCr[x][y] + 2 * CSign * resCb[x][y])/5. | 3 |

TABLE 2

Reconstruction of chroma residuals.

| tu_cbf_cb | tu_cbf_cr | reconstruction of Cb and Cr residuals | mode |
|---|---|---|---|
| 1 | 0 | res'Cb[x][y] = resJointC'[x][y]<br>res'Cr[x][y] = (CSign * resJointC'[x][y]) >> 1 | 1 |
| 1 | 1 | res'Cb[x][y] = resJointC'[x][y]<br>res'Cr[x][y] = CSign * resJointC'[x][y] | 2 |
| 0 | 1 | res'Cb[x][y] = (CSign * resJointC'[x][y]) >> 1<br>res'Cr[x][y] = resJointC'[x][y] | 3 |

The three joint chroma coding modes described above may be supported in intra predicted CUs. For non-intra CUs, only mode 2 in Table 1 and Table 2 may be supported. Hence, in non-intra CUs, the syntax element tu_joint_cbcr_residual_flag is only present if both chroma CBFs are 1.

In Xu, et al. "CE8-related: SPS level flags for BDPCM and JCCR," Joint Video Experts Team (JVET) of ITU-T SG 16 WP 3 and ISO/IEC JTC 1/SC 29/WG 11, 15$^{th}$ Meeting: 15$^{th}$ Meeting: Gothenberg, SE, 3-12 Jul. 2019, JVET-O0376 (hereinafter "JVET-O0376"), a sequence parameter set (SPS) level flag has been added to control enabling/disabling of joint-Cb-Cr (JCCR) for each video sequence. Accordingly, by setting this SPS flag to zero, an explicit way of disabling JCCR can be carried out in VVC.

In Clare, et al. "CE8-4.1: BDPCM and Transform skip for Chroma," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P0059 (hereinafter "JVET-P0059"), chroma Transform Skip is proposed (i.e., Transform skip is extended for chroma components (in addition to luma component)). Due to the inclusion of Chroma Transform Skip (ChromaTS) in VVC Standard, chroma components currently have two options for multiple transform selection (MTS): DCT2 (mts_idx=0) and ChromaTS (mts_idx=1). DCT2 stands for discrete cosine transform of type 2. VVC specification allows the combination of ChromaTS and JCCR. That is, it is possible to jointly signal chroma residuals, and this joint residual can be transform skipped.

For example, in JCCR, video encoder 200 may determine a first residual block for a first chroma component (e.g., resCb[x][y]=origCb[x][y]−predCb[x][y]), and determine a second residual block for a second chroma component (e.g., resCr[x][y]=origCr[x][y]−predCr[x][y]). In JCCR with transform enabled, video encoder 200 may determine a joint residual block based on the first residual block and the second residual block, then perform transform such as being using DCT-2, as one example to generate a transformed joint residual block. In JCCR with transform skip, video encoder 200 may determine the joint residual block based on the first residual block and the second residual block and bypass (e.g., skip) transforming the joint residual block.

There may be certain issues with JCCR. For example, in a version of VVC reference test model (i.e., in VTM-7.0), the encoder search by video encoder 200 for JCCR utilizes only DCT2 (e.g., a first type of transform with transform enabled) but not ChromaTS (e.g., a second type transform, like transform skip). Accordingly, the combination of JCCR and chromaTS may never be searched by video encoder 200.

For example, video encoder 200 may determine rate-distortion values for JCCR with a first transform type (e.g., DCT2) but may not determine rate-distortion values for JCCR with a second transform type (e.g., transform skip (also called chromaTS)). Therefore, using JCCR with transform skip may not have been possible even if JCCR with transform skip provided desirable rate-distortion and should be selected as the coding mode.

One way to enable JCCR search also for ChromaTS would be to do another RD (rate-distortion) search with ChromaTS, in addition to DCT2. However, performing another RD search may increase encoding runtime.

For example, video encoder 200 may determine a first rate-distortion value for JCCR with a first transform type (e.g., DCT2) and then determine a second rate-distortion value for JCCR with a second transform type (e.g., transform skip, also called chromaTS), and then determine whether to encode using JCCR with the first transform type or JCCR with the second transform type based on the first and second rate-distortion values. Determining both the first rate-distortion value and the second rate-distortion value may require processing time that delays encoding. Therefore, some techniques always determined only a rate-distortion value for JCCR with DCT2 to avoid increase in processing time. Such techniques may be problematic because there may be times when JCCR with transform skip is preferred (e.g., provides better rate-distortion) but was not even a coding option.

In one or more examples, video encoder 200 may be configured to select whether to determine a rate-distortion value associated with JCCR with a first transform type (e.g., DCT2) or JCCR with a second transform type (e.g., transform skip) based on coding information associated with the chroma blocks of the coding unit. Therefore, rather than defaulting to always only determining a rate-distortion value for JCCR with DCT2, the example techniques allow for selecting an option of determining a rate-distortion value for JCCR with transform skip, which at times may provide better rate-distortion. Also, because video encoder 200 may selectively determine the rate-distortion value for JCCR with the first transform type or determine the rate-distortion value for JCCR with the second transform type, there may not be an increase in the encoding time compared to techniques that always determined only the rate-distortion value for JCCR with DCT2.

That is, this disclosure describes techniques for keeping single RD search (same as VTM-7.0) for JCCR when testing DCT2 and chromaTS. In this way, video encoder 200 may determine whether DCT2 or chromaTS (transform skip) is to be used when JCCR is enabled with a single RD search, which may not increase the computational complexity of video encoder 200.

In this disclosure DCT2 and chromaTS are used as examples as two transform types, but the example techniques may be extended to a first transform type and a second transform type, where one non-limiting example of the first transform type is DCT2 and one non-limiting example of the second transform type is chromaTS (e.g., transform skip). In this disclosure, transform skip may be considered as a transform type from a plurality of transform types that may be utilized. That is, transform types may be include DCT2 and avoiding performing a transform.

In VTM-7.0, encoder search by video encoder 200 for JCCR is performed after the encoder search of independent Cb and Cr residual coding. JCCR search is invoked depending on the best independent coding of Cb and Cr component (i.e., when either Cb or Cr component has a nonzero CBF, JCCR search is enabled).

For example, a coding unit includes a first chroma block and a second chroma block. Video encoder 200 may be configured to determine a first rate-distortion value associated with encoding the first chroma block with the first transform type (e.g., DCT2), and without JCCR, a second rate-distortion value associated with encoding the first chroma block with the second transform type (e.g., transform skip), and without JCCR. Similarly, video encoder 200 may be configured to determine rate-distortion values associated with encoding the second chroma block with the first transform type and with the second transform type, and without JCCR. In some examples, after video encoder 200 determines these rate-distortion values, video encoder 200 may determine a rate-distortion value associated with JCCR.

In accordance with one or more examples described in this disclosure, video encoder 200 may utilize two or more of the rate-distortion values for encoding the first and second chroma blocks, without JCCR, to determine whether to determine a rate-distortion value associated with encoding the coding unit with JCCR with the first transform type or determine a rate-distortion value associated with encoding the coding unit with JCCR with the second transform type. For example, in order to keep a single RD search, while utilizing both DCT2 and chromaTS, this disclosure describes a decision strategy incorporated for the encoder search. The decision whether to perform the search with DCT2 or ChromaTS is taken from the MTS index of the best independent coding of Cb and Cr component, as described in Table 3 below.

TABLE 3

| MTS selection for JCCR search | | |
|---|---|---|
| bestTU[Cb] | bestTU[Cr] | MTS selection for JCCR |
| DCT2 | — | DCT2 |
| DCT2 | DCT2 | DCT2 |
| — | DCT2 | DCT2 |
| ChromaTS | — | ChromaTS |
| — | ChromaTS | ChromaTS |
| ChromaTS | ChromaTS | ChromaTS |
| ChromaTS | DCT2 | RD search skipped |
| DCT2 | ChromaTS | RD search skipped |
| — | — | RD search skipped |

As shown in Table 3, JCCR search is avoided when the MTS index of best independent coding of Cb and Cr component is different (i.e., when one is using DCT2 and other is using ChromaTS). In some cases, JCCR is based on an assumption that the residual of Cb and Cr component are similar (at least structure-wise, one can be a scaled version of another although). Different MTS index (DCT2 or ChromaTS) suggests that the residual characteristics of Cb and Cr are different, and thus most probably JCCR will not be used. For the remaining combinations, for JCCR, DCT2 is checked when either of the component use DCT2 for best independent coding, and similarly ChromaTS is checked when either of the component use ChromaTS for best independent coding.

In Table 3, the entries with "-" for bestTU[Cb] or bestTU[Cr] mean that the associated CBF is 0 for a Cb residual block or a Cr residual block. For instance, if bestTU[Cr] includes "-", it may be for the case where the coefficients of residual block for the Cr are zeros. Similarly, if bestTU[Cb] includes "-", it may be for the case where the coefficients of residual block for the Cb are zeros. The entries with "RD search skipped" for MTS selection for JCCR mean that the RD search is skipped for JCCR enabled case, i.e., no transform types are checked (for example, DCT2 or chromaTS) for rate-distortion cost.

Accordingly, in some examples, it may be possible to determine whether to determine the rate-distortion value for JCCR with DCT2 or the rate-distortion value for JCCR with chromaTS based on bestTU for one of the Cb or Cr chroma blocks. For instance, per Table 3, if CBF is 0 for Cr residual block, then if the rate-distortion value for the Cb residual block with DCT2 indicates better rate-distortion than the rate-distortion value for the Cb residual block with chromaTS, video encoder 200 may determine that the rate-distortion value for JCCR with DCT2 should be determined and avoid determining the rate-distortion value for JCCR with chromaTS. Similarly, per Table 3, if CBF is 0 for Cb residual block, then if the rate-distortion value for the Cr residual block with chromaTS indicates better rate-distortion than the rate-distortion value for the Cr residual block with DCT2, video encoder 200 may determine that the rate-distortion value for JCCR with chromaTS should be determined and avoid determining the rate-distortion value for JCCR with DCT2.

For example, video encoder 200 may determine a first rate-distortion value associated with encoding a first chroma block of a coding unit with transform enabled (e.g., DCT2) and determine a second rate-distortion value associated with encoding a first chroma block of the coding unit with transform skip. If video encoder 200 determines that the first rate-distortion value associated with encoding the first chroma block with transform enabled indicates better rate-distortion than the second rate-distortion value associated with encoding the first chroma block with transform skip, then video encoder 200 may determine a rate-distortion value associated with encoding the coding unit with JCCR with transform enabled, and avoid determining (e.g., not determine) a rate-distortion value associated with encoding the coding unit with JCCR with transform skip. However, if video encoder 200 determines that the second rate-distortion value associated with encoding the first chroma block with transform skip indicates better rate-distortion than the first rate-distortion value associated with encoding the first chroma block with transform enabled, then video encoder 200 may determine a rate-distortion value associated with encoding the coding unit with JCCR with transform skip, and avoid determining (e.g., not determine) a rate-distortion value associated with encoding the coding unit with JCCR with transform enabled.

In some cases, the CBF is 0 for a second chroma block of the coding unit (e.g., the residual block has all zero coefficients). However, in examples where the residual block for the second chroma block has CBF equal to 1 (e.g., the residual block does not only have zero coefficients), video encoder 200 may determine a rate-distortion value associated with encoding the second chroma block with transform enabled and a rate-distortion value associated with encoding the second chroma block with transform skip. If the rate-distortion values for both the first chroma block and the second chroma block indicate that transform enabled is preferred (e.g., provides better rate-distortion), then video encoder 200 may determine a rate-distortion value associated with JCCR with transform enabled, and avoid determining a rate-distortion value associated with JCCR with transform skip. If the rate-distortion values for both the first chroma block and the second chroma block indicate that transform skip is preferred (e.g., provides better rate-distortion), then video encoder 200 may determine a rate-distortion value associated with JCCR with transform skip, and avoid determining a rate-distortion value associated with JCCR with transform enabled.

In some cases, it may be possible that the rate-distortion values for the first chroma block indicate that transform enabled is preferred but the rate-distortion values for the second chroma block indicate that transform skip is preferred, or vice-versa. In such cases, video encoder 200 may not determine a rate-distortion value for JCCR with transform skip or transform enabled.

Accordingly, video encoder 200 may select between a first transform type (e.g., transform enabled or transform skip) or a second transform type (e.g., the other of transform enabled or transform skip) for joint chroma residuals generated from residual chroma values for two chroma components (e.g., for JCCR) and perform operations in accordance with the selected transform type. For instance, the first transform type is a discrete cosine transform (DCT) 2 and the second transform type is transform skip, or vice-versa. In some examples, to select between the first transform type and the second transform type, video encoder 200 may be configured to determine a transform type for residual values of a first chroma component of the two chroma components (e.g., bestTU[Cb] of Table 3), determine a transform type for residual values of a second chroma component of the two chroma components (e.g., bestTU[Cr] of Table 3), and select between the first transform type and the second transform type based on the determined transform type for the residual values of the first chroma component and the determined transform type for the residual values of the second chroma component.

For example, video encoder 200 may determine a first rate-distortion value associated with encoding a first chroma block of a coding unit of the video data with a first transform type (e.g., DCT2 or transform skip) and determine a second rate-distortion value associated with encoding the first chroma block of the coding unit of the video data with a second transform type (e.g., other of DCT2 or transform skip). Video encoder 200 may determine that the first transform type provides better rate-distortion based on the first rate-distortion value and the second rate-distortion value.

As an example, assume that the first chroma block is the Cb block. With respect to Table 3, video encoder 200 may determine that bestTU[Cb] is DCT2 if the first transform type is DCT2, or may determine that bestTU[Cb] is ChromaTS (transform skip) if the first transform type is ChromaTS. As another example, assume that the first chroma block is the Cr block. With respect to Table 3, video encoder 200 may determine that bestTU[Cr] is DCT2 if the first transform type is DCT2, or may determine that bestTU[Cr] is ChromaTS (transform skip) if the first transform type is ChromaTS.

Based on the determination that the first transform type provides better rate-distortion, video encoder 200 may determine a third rate-distortion value associated with encoding the coding unit with joint coding of chroma residuals (JCCR) with the first transform type, and avoiding determining a fourth rate-distortion value associated with encoding the coding unit with JCCR with the second transform type. That is, video encoder 200 may determine the rate-distortion value associated with encoding JCCR with the first transform type and not determine the rate-distortion value associated with encoding JCCR with the second transform type. For instance, if the first transform type is DCT2, then video encoder 200 may determine the rate-distortion value associated with encoding JCCR with DCT2 and avoid determining the rate-distortion value associated with encoding JCCR with chromaTS. Conversely, if the first transform type is chromaTS, then video encoder 200 may determine the rate-distortion value associated with encoding JCCR with chromaTS and avoid determining the rate-distortion value associated with encoding JCCR with DCT2.

In the above example, video encoder 200 may determine the rate-distortion value for a first chroma block. In some examples, video encoder 200 may determine the rate-distortion value for the first chroma block and the second chroma block. For example, in the above example, the first transform type provided better rate-distortion. In some examples, a rate-distortion value associated with encoding the second chroma block of the coding unit with the first transform type indicates better rate-distortion than a rate-distortion value associated with encoding the second chroma block of the coding unit with the second transform type.

For example, Table 3 includes a row where bestTU[Cb] and bestTU[Cr] are both DCT2. In such examples, the rate-distortion values for encoding both the first chroma block and the second chroma block with DCT2 may be better than the respective rate-distortion values for encoding both the first chroma block and the second chroma block with chromaTS. Similarly, Table 3 includes a row where bestTU[Cb] and bestTU[Cr] are both chromaTS. In such examples, the rate-distortion values for encoding both the first chroma block and the second chroma block with chromaTS may be better than the respective rate-distortion values for encoding both the first chroma block and the second chroma block with DCT2.

Accordingly, in some examples, to select between the first transform type and the second transform type based on the determined transform type for the residual values of the first chroma component and the determined transform type for the residual values of the second chroma component, video encoder 200 is configured to, based on the determined transform type for the residual values of the first chroma component and the determined transform type for the residual values of the second chroma component being the first transform type, select the first transform type, or based on the determined transform type for the residual values of the first chroma component and the determined transform type for the residual values of the second chroma component being the second transform type, select the second transform type.

In some examples, video encoder 200 may be configured to determine a transform type for residual values of a first chroma component of two chroma components, determine a transform type for residual values of a second chroma component of the two chroma components, and based on the determined transform type for residual values of the first chroma component of the two chroma components and the determined transform type for residual values of the second chroma component of the two chroma components being different, code the residual values of the first chroma component and the residual values for the second chroma component separately (e.g., avoid enabling JCCR).

Video encoder 200 may encode the coding unit with JCCR with the first transform type. For example, if the third-rate distortion value (e.g., the rate-distortion value associated with encoding the coding unit with JCCR with the transform type) indicates better rate-distortion than at least one of the first rate-distortion value and the second rate-distortion value, then video encoder 200 may encode the coding unit with JCCR with the first transform type.

As one example, video encoder 200 may generate a first residual block (e.g., one of resCb[x][y] or resCr[x][y]) for the first chroma block of the coding unit and a second residual block (e.g., other of resCb[x][y] or resCr[x][y]) for a second chroma block of the coding unit. Video encoder 200 may generate a joint residual block (e.g., resJointC[x][y]) based on the first residual block and the second residual block, and signal information indicative of the joint residual block.

In examples where encoding with JCCR and DCT2 is preferred, video encoder 200 may generate the joint residual block using the first residual block and the second residual block, and perform DCT2 transform on the joint residual block. For example, video encoder 200 may perform transform on the joint residual block to generate a transformed joint residual block, and signal information indicative of the transformed joint residual block.

In examples where encoding with JCCR and transform skip is preferred, video encoder 200 may generate the joint residual block using the first residual block and the second residual block, and video encoder 200 may skip performing transform on the residual block. Video encoder 200 may signal information indicative of the joint residual block.

To generate the joint residual block, video encoder 200 may determine at least one of: resJointC[x][y]=(4*resCb[x][y]+2*Csign*resCr[x][y])/5, resJointC[x][y]=(resCb[x][y]+Csign*resCr[x][y])/2, or resJointC[x][y]=(4*resCr[x][y]+2*Csign*resCb[x][y])/5, where resJointC is the joint residual block. Video encoder 200 may then signal information indicative of resJointC after transforming resJointC if transform is enabled, or signal information indicative of resJoinC without transforming resJointC if transform is skipped.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
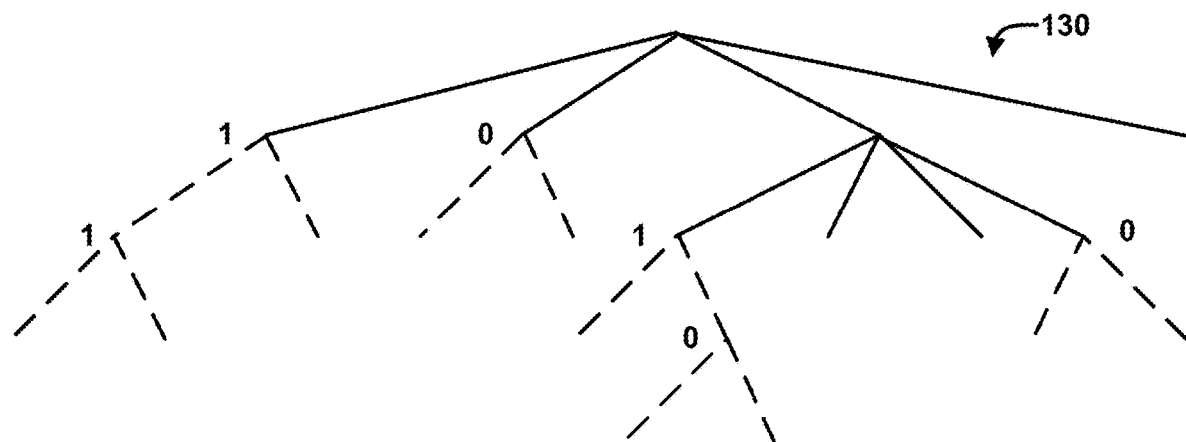
FIGS. 2A and 2B are conceptual diagrams illustrating an example quadtree binary tree (QTBT) structure, and a corresponding coding tree unit (CTU).
Figure 2B:
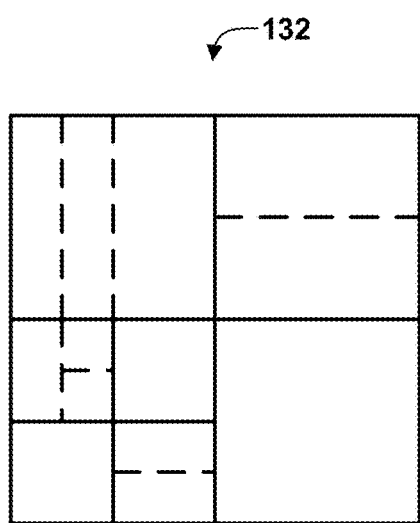

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
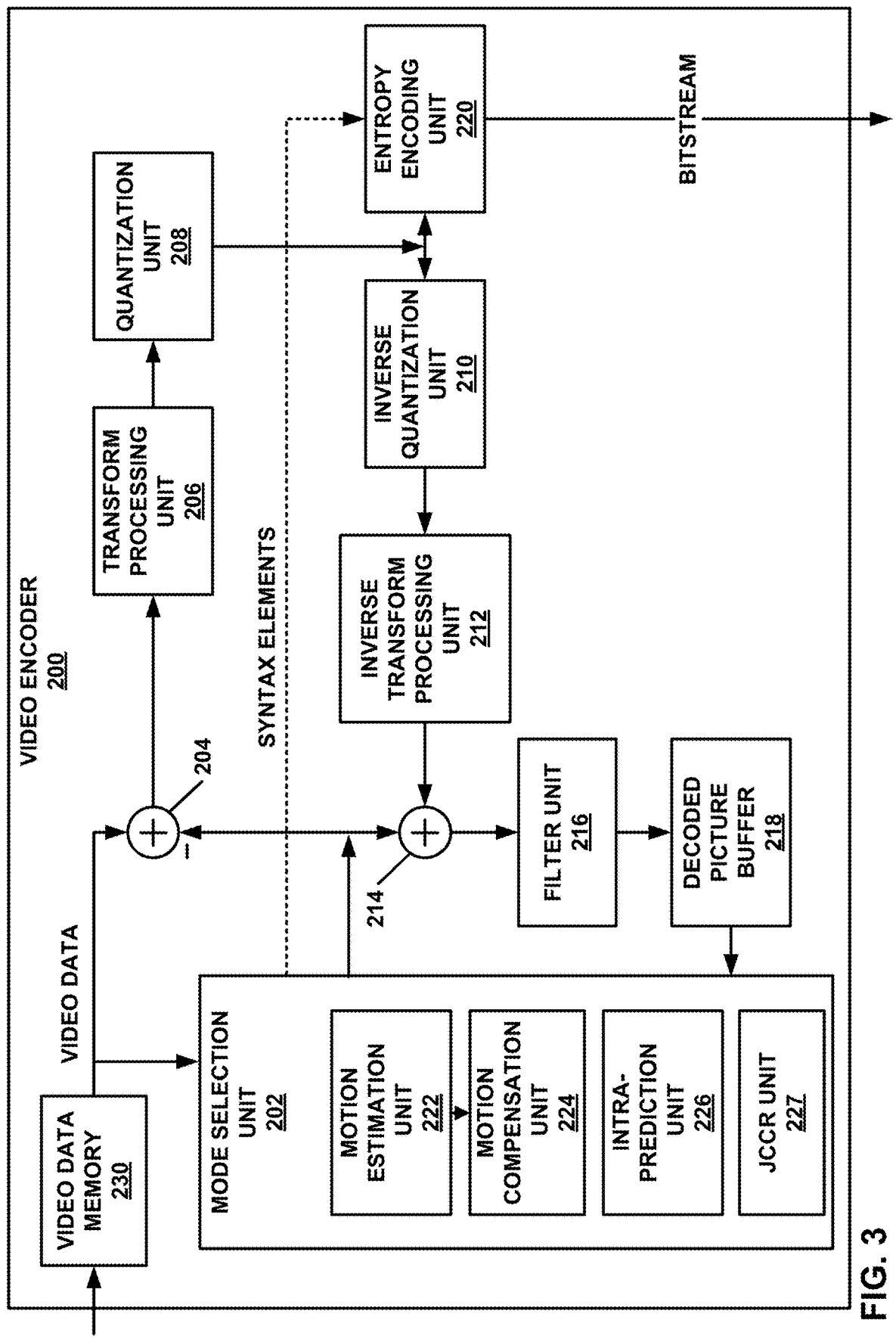
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of JEM, VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, an intra-prediction unit 226, and JCCR unit 227. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

This disclosure describes example techniques to reduce or limit the number of encoding passes mode selection unit 202 needs to test for encoding a coding unit using joint coding of chroma residuals (JCCR). For example, there may be a possibility of JCCR with a first transform type (e.g., DCT2 or transform skip) and a possibility of JCCR with a second transform type (e.g., other of DCT2 or transform skip). Rather than determining the rate-distortion values associated with both JCCR with the first transform type and JCCR with the second transform type, mode selection unit 202 may select to determine the rate-distortion value for one of JCCR with the first transform type or the second transform type and avoid determining the rate-distortion value for the other one of JCCR with the first transform type or the second transform type.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block. When transform processing unit 206 does not apply transforms to a residual block, the coding mode may be referred to as transform skip, and transform skip for chroma blocks may be identified as chromaTS, as described above.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to select between a first transform type or a second transform type for joint chroma residuals generated from residual chroma values for two chroma components (e.g., for JCCR) and perform operations in accordance with the selected transform type. For instance, the first transform type is a discrete cosine transform (DCT) 2 and the second transform type is transform skip. In some examples, to select between the first transform type and the second transform type, the processing units may be configured to determine a transform type for residual values of a first chroma component of the two chroma components (e.g., bestTU[Cb] of Table 3), determine a transform type for residual values of a second chroma component of the two chroma components (e.g., bestTU[Cr] of Table 3), and select between the first transform type and the second transform type based on the determined transform type for the residual values of the first chroma component and the determined transform type for the residual values of the second chroma component.

In some examples, to select between the first transform type and the second transform type based on the determined transform type for the residual values of the first chroma component and the determined transform type for the residual values of the second chroma component, the processing units are configured to, based on the determined transform type for the residual values of the first chroma component and the determined transform type for the residual values of the second chroma component being the first transform type, select the first transform type, or based on the determined transform type for the residual values of the first chroma component and the determined transform type for the residual values of the second chroma component being the second transform type, select the second transform type.

In some examples, the processing units may be configured to determine a transform type for residual values of a first chroma component of two chroma components, determine a transform type for residual values of a second chroma component of the two chroma components, and based on the determined transform type for residual values of the first chroma component of the two chroma components and the determined transform type for residual values of the second chroma component of the two chroma components being different, code the residual values of the first chroma component and the residual values for the second chroma component separately (e.g., avoid enabling JCCR).

As one example, mode selection unit 202 may be configured to determine a first rate-distortion value associated with encoding a first chroma block of a coding unit of the video data with a first transform type, determine a second rate-distortion value associated with encoding the first chroma block of the coding unit of the video data with a second transform type, determine that the first transform type provides better rate-distortion based on the first rate-distortion value and the second rate-distortion value. Based on the determination that the first transform type provides better rate-distortion, mode selection unit 202 may determine a third rate-distortion value associated with encoding the coding unit with joint coding of chroma residuals (JCCR) with the first transform type, and avoid determining a fourth rate-distortion value associated with encoding the coding unit with JCCR with the second transform type.

For example, mode selection unit 202 may determine a first rate-distortion value associated with encoding a first chroma block of a coding unit with transform enabled (e.g., DCT2) and determine a second rate-distortion value associated with encoding the first chroma block of the coding unit with transform skip.

If mode selection unit 202 determines that the first rate-distortion value associated with encoding the first chroma block with transform enabled indicates better rate-distortion than the second rate-distortion value associated with encoding the first chroma block with transform skip, then mode selection unit 202 may determine a rate-distortion value associated with encoding the coding unit with JCCR with transform enabled, and avoid determining (e.g., not determine) a rate-distortion value associated with encoding the coding unit with JCCR with transform skip. However, if mode selection unit 202 determines that the second rate-distortion value associated with encoding the first chroma block with transform skip indicates better rate-distortion than the first rate-distortion value associated with encoding the first chroma block with transform enabled, then mode selection unit 202 may determine a rate-distortion value associated with encoding the coding unit with JCCR with transform skip, and avoid determining (e.g., not determine) a rate-distortion value associated with encoding the coding unit with JCCR with transform enabled.

In some cases, coefficients for a residual block for a second chroma block of the coding unit are all zero (e.g., CBF for the second chroma block is 0). However, in examples where not all coefficients of the residual block for the second chroma block are zero (e.g., CBF for the second chroma block is 1), mode selection unit 202 may determine a rate-distortion value associated with encoding the second chroma block with transform enabled and a rate-distortion value associated with encoding the second chroma block with transform skip. If the rate-distortion values for both the first chroma block and the second chroma block indicate that transform enabled is preferred (e.g., provides better rate-distortion), then mode selection unit 202 may determine a rate-distortion value associated with JCCR with transform enabled, and avoid determining a rate-distortion value associated with JCCR with transform skip. If the rate-distortion values for both the first chroma block and the second chroma block indicate that transform skip is preferred (e.g., provides better rate-distortion), then mode selection unit 202 may determine a rate-distortion value associated with JCCR with transform skip, and avoid determining a rate-distortion value associated with JCCR with transform enabled.

In some cases, it may be possible that the rate-distortion values for the first chroma block indicate that transform enabled is preferred but the rate-distortion values for the second chroma block indicate that transform skip is preferred, or vice-versa. In such cases, video encoder 200 may not determine a rate-distortion value for JCCR with transform skip or transform enabled.

JCCR unit 227 may be configured to perform JCCR in accordance with one or more techniques described in this disclosure. As one example, JCCR unit 227 may encode the coding unit with JCCR with the first transform type. To encode the coding unit with JCCR with the first transform type, JCCR unit 227 may generate a first residual block for the first chroma block of the coding unit and a second residual block for a second chroma block of the coding unit, generate a joint residual block based on the first residual block and the second residual block, and signal information based on of the joint residual block (e.g., via entropy encoding unit 220).

For transform enabled, JCCR unit 227 may generate the joint residual block based on the first residual block and the second residual block, and then transform the joint residual block (e.g., the joint residual block is transformed by transform processing unit 206). To generate the joint residual block, JCCR unit 227 may determine at least one of resJointC[x][y]=(4*resCb[x][y]+2*Csign*resCr[x][y])/5, resJointC[x][y]=(resCb[x][y]+Csign*resCr[x][y])/2, or resJointC[x][y]=(4*resCr[x][y]+2*Csign*resCb[x][y])/5, where resJointC is the joint residual block, resCb[x][y] is the first residual block, resCr[x][y] is the second residual block, and Csign is +1 or −1. The joint residual block may then be transformed (e.g., with transform processing unit 206).

For transform skip, JCCR unit 227 may generate the joint residual block based on the first residual block and the second residual block, and then skip transforming the joint residual block (e.g., the operations of transform processing unit 206 may be skipped). To generate the joint residual block, JCCR unit 227 may determine at least one of resJointC[x][y]=(4*resCb[x][y]+2*Csign*resCr[x][y])/5, resJointC[x][y]=(resCb[x][y]+Csign*resCr[x][y])/2, or resJointC[x][y]=(4*resCr[x][y]+2*Csign*resCb[x][y])/5, where resJointC is the joint residual block, resCb[x][y] is the first residual block, resCr[x][y] is the second residual block, and Csign is +1 or −1. In this example, the transform of resJointC is skipped (e.g., the operations of transform processing unit 206 may be skipped).

Figure 4:
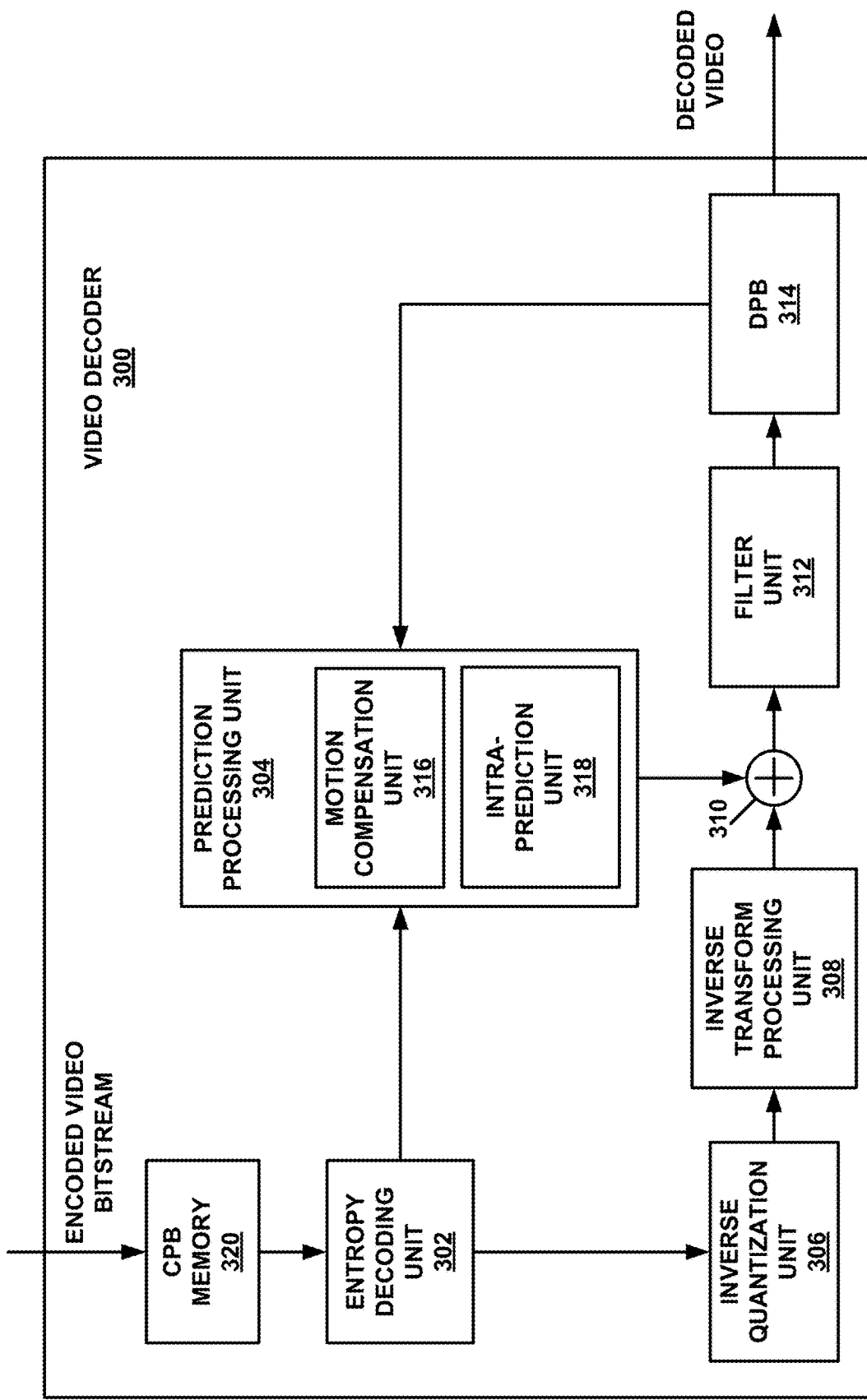
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 5:
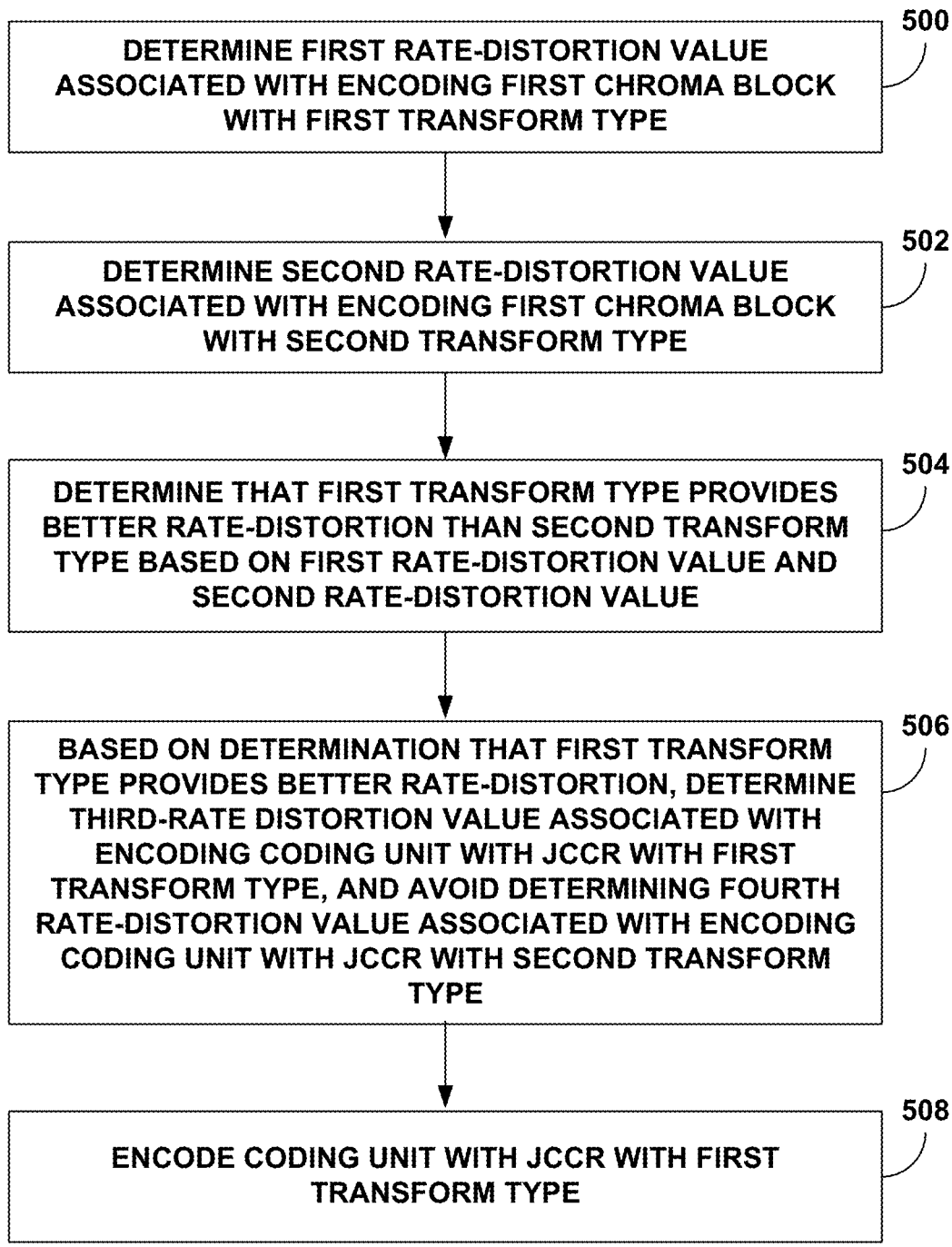
FIG. 5 is a flowchart illustrating an example method of encoding.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

Video encoder 200 may determine a first rate-distortion value associated with encoding a first chroma block of a coding unit of the video data with a first transform type (500). Video encoder 200 may also determine a second rate-distortion value associated with encoding the first chroma block of the coding unit of the video data with a second transform type (502). For example, video encoder 200 may test multiple coding modes and parameters through multiple encoding passes through the coding process, such as that illustrated in FIG. 3. During one of the encoding passes, video encoder 200 (e.g., via mode selection unit 202) may determine the first rate-distortion value associated with encoding a first chroma block (e.g., Cb or Cr block) with a first transform type (e.g., one of the DCTs or DSTs with transform enabled or transform skip) and the second rate-distortion value associated with encoding the first chroma block with a second transform type (e.g., another of the DCTs or DSTs or transform skip).

Video encoder 200 may determine that the first transform type provides better rate-distortion than second transform type based on the first rate-distortion value and the second rate-distortion value (504). The first transform type providing better rate-distortion than second transform type may refer to lower distortion and/or lower bit count for signaling.

For example, if the first transform type is DCT2 and the second transform type is transform skip, then video encoder 200 may determine that the rate-distortion value associated with encoding the first chroma block with DCT2 indicates better rate-distortion (e.g., less distortion and/or fewer bits to signal) than the rate-distortion value associated with encoding the first chroma block with transform skip. As another example, if the first transform type is transform skip and the second transform type is DCT2, then video encoder 200 may determine that the rate-distortion value associated with encoding the first chroma block with transform skip indicates better rate-distortion (e.g., less distortion and/or fewer bits to signal) than the rate-distortion value associated with encoding the first chroma block with DCT2.

Based on the determination that the first transform type provides better rate-distortion, video encoder 200 may determine a third rate-distortion value associated with encoding the coding unit with joint coding of chroma residuals (JCCR) with the first transform type, and avoid determining a fourth rate-distortion value associated with encoding the coding unit with JCCR with the second transform type (506). For example, if the first transform type is DCT2 and the second transform type is transform skip, then video encoder 200 may determine the rate-distortion value for JCCR with DCT2, and avoid determining a rate-distortion value associated with encoding the coding unit with JCCR with transform skip. If the first transform type is transform skip and the second transform type is DCT2, then video encoder 200 may determine the rate-distortion value for JCCR with transform skip, and avoid determining a rate-distortion value associated with encoding the coding unit with JCCR with DCT2.

The above describes the example where the rate-distortion values for a first chroma block are determined. In some examples, video encoder 200 may also determine the rate-distortion values for a second chroma block, such as in examples where not all coefficients of a residual block for the second chroma block are zero. In such examples, a rate-distortion value associated with encoding the second chroma block of the coding unit with the first transform type indicates better rate-distortion than a rate-distortion value associated with encoding the second chroma block of the coding unit with the second transform type.

For example, video encoder 200 may determine a rate-distortion value for encoding the second chroma block with first transform type and determine a rate-distortion value for encoding the second chroma block with the second transform type. If the rate-distortion value for encoding the second chroma block with the first transform type indicated better rate-distortion than the rate-distortion value for encoding the second chroma block with the first transform type, then video encoder 200 may determine a rate-distortion value for encoding the coding unit with JCCR with the first transform type. For instance, in this example, encoding the first and second chroma blocks with the first transform type indicated better rate-distortion than encoding the first and second chroma blocks with the second transform type, and therefore, video encoder 200 may determine a rate-distortion value for encoding the coding unit with JCCR with the first transform type and not with the second transform type. However, if encoding the first chroma block with the first transform type is preferred over the second transform type, but encoding the second chroma block with the second transform type is preferred over the first transform type, or vice-versa, then video encoder 200 may not determine a rate-distortion value for JCCR (e.g., JCCR may not be utilized).

Video encoder 200 may encode the coding unit with JCCR with the first transform type (508). In some examples, video encoder 200 may encoding the coding unit with JCCR with the first transform type if the encoding the coding unit with JCCR is the preferred coding mode (e.g., based on rate-distortion values). For example, video encoder 200 may encode the coding unit with JCCR with the first transform type based on the third rate-distortion value indicating better rate-distortion than at least one of the first rate-distortion value and the second rate-distortion value.

For example, video encoder 200 may generate a first residual block for the first chroma block of the coding unit and a second residual block for a second chroma block of the coding unit, generate a joint residual block based on the first residual block and the second residual block, and signal information based on the joint residual block. The first residual block may be based on a difference between the first chroma block and a first prediction block, and the second residual block may be based on a difference between the second chroma block and a second prediction block.

Video encoder 200 may generate the joint residual block based on the first residual block and the second residual block. For example, video encoder 200 may determine at least one of resJointC[x][y]=(4*resCb[x][y]+2*Csign*resCr[x][y])/5, resJointC[x][y]=(resCb[x][y]+Csign*resCr[x][y])/2, or resJointC[x][y]=(4*resCr[x][y]+2*Csign*resCb[x][y])/5, where resJointC is the joint residual block, resCb[x][y] is the first residual block, resCr[x][y] is the second residual block, and Csign is +1 or −1.

As one example, if the first transform type is DCT2, video encoder 200 perform transform (e.g., with DCT2) on the joint residual block to generate a transformed joint residual block. As another example, if the first transform type is transform skip, then video encoder 200 may skip performing transform on the joint residual block (e.g., avoid transform of joint residual block).

Figure 6:
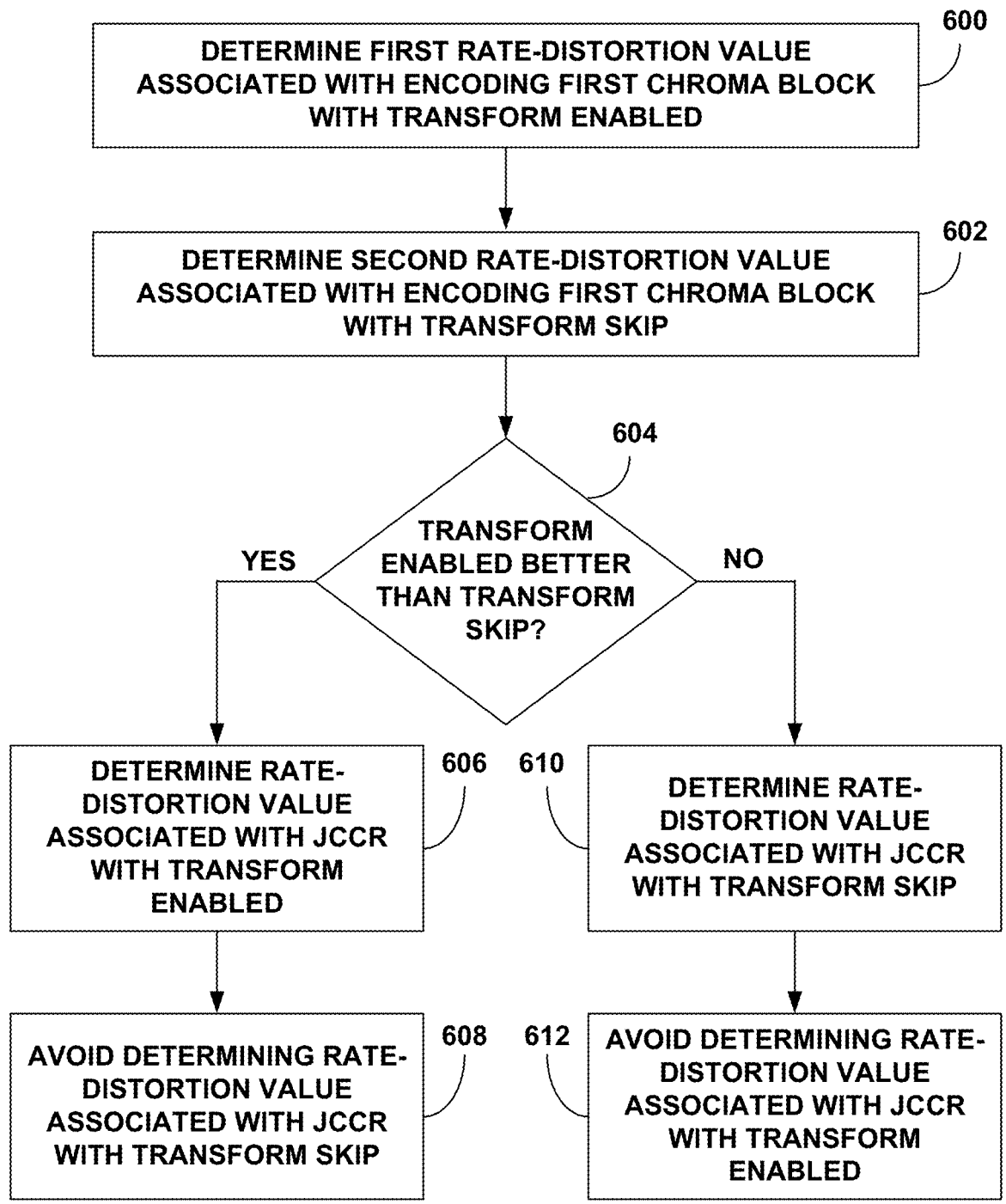
FIG. 6 is a flowchart illustrating another example method of encoding.

FIG. 6 is a flowchart illustrating another example method for encoding a current block. The current block may comprise a current CU. Although described with respect to video encoder 200 (FIGS. 1 and 3), it should be understood that other devices may be configured to perform a method similar to that of FIG. 6.

Similar to FIG. 5, video encoder 200 may determine a first rate-distortion value associated with encoding a first chroma block with transform enabled (e.g., with DCT2) (600). Video encoder 200 may determine a second rate-distortion value associated with encoding the first chroma block with transform skip (602).

Video encoder 200 may determine whether transform enabled provides better rate-distortion or whether transform skip provides better rate-distortion based on the first rate-distortion value and the second rate-distortion value (604). If encoding the first chroma block with transform enabled provides better rate-distortion (YES of 604), then video encoder 200 may determine rate-distortion value associated with JCCR with transform enabled (606) and avoid determining rate-distortion value associated with JCCR with transform skip (608). If encoding the first chroma block with transform skip provides better rate-distortion (NO of 604), then video encoder 200 may determine rate-distortion value associated with JCCR with transform skip (610) and avoid determining rate-distortion value associated with JCCR with transform enabled (612).

The following describes some example techniques that may be used together or in combination.

Clause 1. A method of coding video data, the method comprising selecting between a first transform type or a second transform type for joint chroma residuals generated from residual chroma values for two chroma component; and performing operations in accordance with the selected transform type.

Clause 2. The method of clause 1, wherein the first transform type is a discrete cosine transform (DCT) 2 and the second transform type is transform skip.

Clause 3. The method of any of clause 1 and 2, wherein selecting between the first transform type and the second transform type comprises determining a transform type for residual values of a first chroma component of the two chroma components, determining a transform type for residual values of a second chroma component of the two chroma components, and selecting between the first transform type and the second transform type based on the determined transform type for the residual values of the first chroma component and the determined transform type for the residual values of the second chroma component.

Clause 4. The method of clause 3, wherein selecting between the first transform type and the second transform type based on the determined transform type for the residual values of the first chroma component and the determined transform type for the residual values of the second chroma component comprises based on the determined transform type for the residual values of the first chroma component and the determined transform type for the residual values of the second chroma component being the first transform type, selecting the first transform type, or based on the determined transform type for the residual values of the first chroma component and the determined transform type for the residual values of the second chroma component being the second transform type, selecting the second transform type.

Clause 5. A method of coding video data, the method comprising determining a transform type for residual values of a first chroma component of two chroma components, determining a transform type for residual values of a second chroma component of the two chroma components, based on the determined transform type for residual values of the first chroma component of the two chroma components and the determined transform type for residual values of the second chroma component of the two chroma components being different, coding the residual values of the first chroma component and the residual values for the second chroma component separately.

Clause 6. A method comprising any one or combination of clauses 1-5.

Clause 7. The method of any of clauses 1-5, wherein coding comprises encoding.

Clause 8. A device for coding video data, the device comprising memory configured to store video data and processing circuitry coupled to the memory and configured to perform the method of any one or combination of clauses 1-7.

Clause 9. The device of clause 8, wherein the device comprises one or more of a camera, a computer, a mobile device, a broadcast receiver device, or a set-top box.

Clause 10. The device of any of clauses 8 and 9, wherein the device comprises a video encoder.

Clause 11. A computer-readable storage medium having stored thereon instructions that, when executed, cause one or more processors to perform the method of any of clauses 1-6.

Clause 12. A device for coding video data, the device comprising means for performing the method of any one or combination of clauses 1-6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a first rate-distortion value associated with encoding a first chroma block of a coding unit of the video data with a first transform type;
   determining a second rate-distortion value associated with encoding the first chroma block of the coding unit of the video data with a second transform type;
   determining that the first transform type provides better rate-distortion than second transform type based on the first rate-distortion value and the second rate-distortion value;
   based on the determination that the first transform type provides better rate-distortion, determining a third rate-distortion value associated with encoding the coding unit with joint coding of chroma residuals (JCCR) with the first transform type, and avoiding determining a fourth rate-distortion value associated with encoding the coding unit with JCCR with the second transform type; and
   encoding the coding unit with JCCR with the first transform type, wherein encoding the coding unit with JCCR with the first transform type comprises:
      generating a first residual block for the first chroma block of the coding unit and a second residual block for a second chroma block of the coding unit;
      generating a joint residual block based on the first residual block and the second residual block; and
      signaling information based on the joint residual block.

2. The method of claim 1, wherein a rate-distortion value associated with encoding the second chroma block of the coding unit with the first transform type indicates better rate-distortion than a rate-distortion value associated with encoding the second chroma block of the coding unit with the second transform type.

3. The method of claim 1, wherein the first transform type is discrete cosine transform (DCT), and the second transform type is transform skip.

4. The method of claim 3, wherein encoding the coding unit with JCCR with the first transform type further comprises:
   performing transform on the joint residual block to generate a transformed joint residual block, wherein signaling information based on the joint residual block comprises signaling information indicative of the transformed joint residual block.

5. The method of claim 1, wherein generating the joint residual block based on the first residual block and the second residual block comprises determining at least one of:

$$\text{resJointC}[x][y]=(4*\text{resCb}[x][y]+2*C\text{sign}*\text{resCr}[x][y])/5;$$

$$\text{resJointC}[x][y]=(\text{resCb}[x][y]+C\text{sign}*\text{resCr}[x][y])/2; \text{ or}$$

$$\text{resJointC}[x][y]=(4*\text{resCr}[x][y]+2*C\text{sign}*\text{resCb}[x][y])/5,$$

wherein resJointC is the joint residual block, resCb[x][y] is the first residual block, resCr[x][y] is the second residual block, and Csign is +1 or −1.

6. The method of claim 1, wherein the first transform type is transform skip, and the second transform type is discrete cosine transform (DCT).

7. The method of claim 6, wherein encoding the coding unit with JCCR with the first transform type further comprises:
skipping performing transform on the joint residual block,
wherein signaling information based on the joint residual block comprises signaling information indicative of the joint residual block.

8. The method of claim 1, wherein generating the first residual block for the first chroma block of the coding unit and the second residual block for a second chroma block of the coding unit comprises:
generating the first residual block based on a difference between the first chroma block and a first prediction block; and
generating the second residual block based on a difference between the second chroma block and a second prediction block.

9. The method of claim 1, wherein encoding the coding unit with JCCR with the first transform type comprises encoding the coding unit with JCCR with the first transform type based on the third rate-distortion value indicating better rate-distortion than at least one of the first rate-distortion value and the second rate-distortion value.

10. A device for encoding video data, the device comprising:
memory configured to store the video data; and
processing circuitry configured to:
determine a first rate-distortion value associated with encoding a first chroma block of a coding unit of the video data with a first transform type;
determine a second rate-distortion value associated with encoding the first chroma block of the coding unit of the video data with a second transform type;
determine that the first transform type provides better rate-distortion than second transform type based on the first rate-distortion value and the second rate-distortion value;
based on the determination that the first transform type provides better rate-distortion, determine a third rate-distortion value associated with encoding the coding unit with joint coding of chroma residuals (JCCR) with the first transform type, and avoid determining a fourth rate-distortion value associated with encoding the coding unit with JCCR with the second transform type; and
encode the coding unit with JCCR with the first transform type, wherein to encode the coding unit with JCCR with the first transform type, the processing circuitry is configured to:
generate a first residual block for the first chroma block of the coding unit and a second residual block for a second chroma block of the coding unit;
generate a joint residual block based on the first residual block and the second residual block; and
signal information based on the joint residual block.

11. The device of claim 10, wherein a rate-distortion value associated with encoding the second chroma block of the coding unit with the first transform type indicates better rate-distortion than a rate-distortion value associated with encoding the second chroma block of the coding unit with the second transform type.

12. The device of claim 10, wherein the first transform type is discrete cosine transform (DCT), and the second transform type is transform skip.

13. The device of claim 12, wherein to encode the coding unit with JCCR with the first transform type, the processing circuitry is configured to:
perform transform on the joint residual block to generate a transformed joint residual block,
wherein to signal information based on the joint residual block, the processing circuitry is configured to signal information indicative of the transformed joint residual block.

14. The device of claim 10, wherein to generate the joint residual block based on the first residual block and the second residual block, the processing circuitry is configured to determine at least one of:

$$\text{resJointC}[x][y]=(4*\text{resCb}[x][y]+2*C\text{sign}*\text{resCr}[x][y])/5;$$

$$\text{resJointC}[x][y]=(\text{resCb}[x][y]+C\text{sign}*\text{resCr}[x][y])/2; \text{ or}$$

$$\text{resJointC}[x][y]=(4*\text{resCr}[x][y]+2*C\text{sign}*\text{resCb}[x][y])/5,$$

wherein resJointC is the joint residual block, resCb[x][y] is the first residual block, resCr[x][y] is the second residual block, and Csign is +1 or −1.

15. The device of claim 10, wherein the first transform type is transform skip, and the second transform type is discrete cosine transform (DCT).

16. The device of claim 15, wherein to encode the coding unit with JCCR with the first transform type, the processing circuitry is configured to:
skip performing transform on the joint residual block,
wherein to signal information based on the joint residual block, the processing circuitry is configured to signal information indicative of the joint residual block.

17. The device of claim 10, wherein to generate the first residual block for the first chroma block of the coding unit and the second residual block for a second chroma block of the coding unit, the processing circuitry is configured to:
generate the first residual block based on a difference between the first chroma block and a first prediction block; and
generate the second residual block based on a difference between the second chroma block and a second prediction block.

18. The device of claim 10, wherein to encode the coding unit with JCCR with the first transform type, the processing circuitry is configured to encode the coding unit with JCCR with the first transform type based on the third rate-distortion value indicating better rate-distortion than at least one of the first rate-distortion value and the second rate-distortion value.

19. A non-transitory computer-readable storage medium having instructions stored thereon that when executed cause one or more processors to:
   determine a first rate-distortion value associated with encoding a first chroma block of a coding unit of the video data with a first transform type;
   determine a second rate-distortion value associated with encoding the first chroma block of the coding unit of the video data with a second transform type;
   determine that the first transform type provides better rate-distortion than second transform type based on the first rate-distortion value and the second rate-distortion value;
   based on the determination that the first transform type provides better rate-distortion, determine a third rate-distortion value associated with encoding the coding unit with joint coding of chroma residuals (JCCR) with the first transform type, and avoid determining a fourth rate-distortion value associated with encoding the coding unit with JCCR with the second transform type; and
   encode the coding unit with JCCR with the first transform type, wherein the instructions that cause the one or more processors to encode the coding unit with JCCR with the first transform type comprise instructions that cause the one or more processors to:
      generate a first residual block for the first chroma block of the coding unit and a second residual block for a second chroma block of the coding unit;
      generate a joint residual block based on the first residual block and the second residual block; and
      signal information based on the joint residual block.

20. The non-transitory computer-readable storage medium of claim 19, wherein a rate-distortion value associated with encoding the second chroma block of the coding unit with the first transform type indicates better rate-distortion than a rate-distortion value associated with encoding the second chroma block of the coding unit with the second transform type.

21. The non-transitory computer-readable storage medium of claim 19, wherein the first transform type is discrete cosine transform (DCT), and the second transform type is transform skip.

22. The non-transitory computer-readable storage medium of claim 21, wherein the instructions that cause the one or more processors to encode the coding unit with JCCR with the first transform type comprise instructions that cause the one or more processors to:
   perform transform on the joint residual block to generate a transformed joint residual block,
   wherein the instructions that cause the one or more processors to signal information based on the joint residual block comprise instructions that cause the one or more processors to signal information indicative of the transformed joint residual block.

23. The non-transitory computer-readable storage medium of claim 19, wherein the instructions that cause the one or more processors to generate the joint residual block based on the first residual block and the second residual block comprise instructions that cause the one or more processors to determine at least one of:

$$resJointC[x][y]=(4*resCb[x][y]+2*Csign*resCr[x][y])/5;$$

$$resJointC[x][y]=(resCb[x][y]+Csign*resCr[x][y])/2; \text{ or}$$

$$resJointC[x][y]=(4*resCr[x][y]+2*Csign*resCb[x][y])/5,$$

wherein resJointC is the joint residual block, resCb[x][y] is the first residual block, resCr[x][y] is the second residual block, and Csign is +1 or −1.

24. The non-transitory computer-readable storage medium of claim 19, wherein the first transform type is transform skip, and the second transform type is discrete cosine transform (DCT).

25. The non-transitory computer-readable storage medium of claim 24, wherein the instructions that cause the one or more processors to encode the coding unit with JCCR with the first transform type comprise instructions that cause the one or more processors to:
   skip performing transform on the joint residual block,
   wherein the instructions that cause the one or more processors to signal information based on the joint residual block comprise instructions that cause the one or more processors to signal information indicative of the joint residual block.

26. The non-transitory computer-readable storage medium of claim 19, wherein the instructions that cause the one or more processors to generate the first residual block for the first chroma block of the coding unit and the second residual block for a second chroma block of the coding unit comprise instructions that cause the one or more processors to:
   generate the first residual block based on a difference between the first chroma block and a first prediction block; and
   generate the second residual block based on a difference between the second chroma block and a second prediction block.

27. The non-transitory computer-readable storage medium of claim 19, wherein the instructions that cause the one or more processors to encode the coding unit with JCCR with the first transform type comprise instructions that cause the one or more processors to encode the coding unit with JCCR with the first transform type based on the third rate-distortion value indicating better rate-distortion than at least one of the first rate-distortion value and the second rate-distortion value.

28. A device for encoding video data, the device comprising:
   means for determining a first rate-distortion value associated with encoding a first chroma block of a coding unit of the video data with a first transform type;
   means for determining a second rate-distortion value associated with encoding the first chroma block of the coding unit of the video data with a second transform type;
   means for determining that the first transform type provides better rate-distortion than second transform type based on the first rate-distortion value and the second rate-distortion value;
   based on the determination that the first transform type provides better rate-distortion, means for determining a third rate-distortion value associated with encoding the coding unit with joint coding of chroma residuals (JCCR) with the first transform type, and avoiding determining a fourth rate-distortion value associated with encoding the coding unit with JCCR with the second transform type; and
   means for encoding the coding unit with JCCR with the first transform type, wherein the means for encoding the coding unit with JCCR with the first transform type comprises:

means for generating a first residual block for the first chroma block of the coding unit and a second residual block for a second chroma block of the coding unit;
means for generating a joint residual block based on the first residual block and the second residual block; and
means for signaling information based on the joint residual block.

29. The device of claim 28, wherein a rate-distortion value associated with encoding the second chroma block of the coding unit with the first transform type indicates better rate-distortion than a rate-distortion value associated with encoding the second chroma block of the coding unit with the second transform type.

* * * * *